United States Patent
González Gozalbo

(10) Patent No.: US 10,850,832 B2
(45) Date of Patent: Dec. 1, 2020

(54) LIFTING SURFACE OF AN AIRCRAFT FOR INCREASING THE GENERATED LIFT FORCE

(71) Applicant: Airbus Operations S.L., Getafe (ES)

(72) Inventor: Alfonso González Gozalbo, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 399 days.

(21) Appl. No.: 15/817,388

(22) Filed: Nov. 20, 2017

(65) Prior Publication Data
US 2018/0148164 A1    May 31, 2018

(30) Foreign Application Priority Data
Nov. 25, 2016    (EP) ..................................... 16382566

(51) Int. Cl.
| | | |
|---|---|---|
| *B64C 23/06* | (2006.01) | |
| *B64C 9/34* | (2006.01) | |
| *B64C 9/22* | (2006.01) | |
| *B64C 5/02* | (2006.01) | |
| *B64C 9/08* | (2006.01) | |
| *B64C 3/14* | (2006.01) | |
| *B64C 21/08* | (2006.01) | |

(52) U.S. Cl.
CPC ................ *B64C 23/06* (2013.01); *B64C 3/14* (2013.01); *B64C 5/02* (2013.01); *B64C 9/08* (2013.01); *B64C 9/22* (2013.01); *B64C 9/34* (2013.01); *B64C 21/08* (2013.01); *B64C 2003/146* (2013.01); *Y02T 50/10* (2013.01); *Y02T 50/30* (2013.01)

(58) Field of Classification Search
CPC .. B64C 23/06; B64C 3/14; B64C 5/02; B64C 9/08; B64C 9/22; B64C 9/34; B64C 21/08; B64C 2003/146; Y02T 50/12; Y02T 50/162; Y02T 50/166; Y02T 50/32
See application file for complete search history.

(56) References Cited

U.S. PATENT DOCUMENTS

| | | |
|---|---|---|
| 2,358,985 A | 9/1944 | McAndrew |
| 4,291,853 A | 9/1981 | Sigalla |
| (Continued) | | |

FOREIGN PATENT DOCUMENTS

| | | |
|---|---|---|
| DE | 434778 | 10/1926 |
| EP | 0267023 | 5/1988 |

OTHER PUBLICATIONS

European Search Report, dated May 18, 2017, priority document.

*Primary Examiner* — Rodney A Bonnette
(74) *Attorney, Agent, or Firm* — Greer, Burns & Crain, Ltd.

(57) ABSTRACT

A lifting surface of an aircraft, comprising a leading edge and a notch located in the leading edge. The notch comprises two walls adapted to be parallel to the direction of the incident flow to the lifting surface and a third wall adapted to face the incident flow to the lifting surface when it is in flight. The lifting surface also comprises a retractable cover element, the notch and the retractable cover element being configured such that when the retractable cover element does not cover the notch, the notch is exposed to the incident flow generating a vortex which increases the lift force of the lifting surface, delaying stall.

8 Claims, 5 Drawing Sheets

(56) References Cited

U.S. PATENT DOCUMENTS

| | | | |
|---|---|---|---|
| 4,913,381 A * | 4/1990 | Mabey | B64C 21/10 |
| | | | 244/200 |
| 5,037,044 A | 8/1991 | Seyfang | |
| 5,056,741 A | 10/1991 | Bliesner et al. | |
| 5,282,591 A | 2/1994 | Walters et al. | |
| 8,657,238 B2 * | 2/2014 | Fox | B64C 9/24 |
| | | | 244/204.1 |
| 2006/0060721 A1 | 3/2006 | Watts et al. | |
| 2013/0056585 A1 * | 3/2013 | Llamas Sandin | B64C 3/14 |
| | | | 244/134 E |

\* cited by examiner

LIFTING SURFACE OF AN AIRCRAFT FOR INCREASING THE GENERATED LIFT FORCE

CROSS-REFERENCES TO RELATED APPLICATIONS

This application claims the benefit of the European patent application No. 16382566.4 filed on Nov. 25, 2016, the entire disclosures of which are incorporated herein by way of reference.

FIELD OF THE INVENTION

The present invention relates to a lifting surface such as wing, HTP or VTP where a leading edge device is used to promote an attachment vortex at high angles of attack, where there is always a demand for additional lift.

BACKGROUND OF THE INVENTION

The lifting capacity of a lifting surface of an aircraft is chosen as a compromise between differing requirements. Usually increasing lifting capacity will increase drag, which reduces performance during the cruising portion of flight. Commercial aircraft are optimized for speed and efficiency during the cruise portion of flight, since this is where the aircraft spends the vast majority of its flight time.

In order to achieve an increase in the lift coefficient of aerodynamic surfaces, high-lift devices are well-known in the prior art, and they are conventionally used in wings. There are many different types of high-lift devices, which are used alone or in combination with others and, in general, either modify the outer form of the profile or control the boundary layer in order to delay separation and hence, stall.

High-lift devices add lift at take-off and landing, reducing the distance and speed required to safely land the aircraft and allowing the use of a more efficient wing in flight.

The lift developed by the lifting surface increases as angle of attack increases, until the angle of attack reaches a critical value beyond which a stall is produced. Stall occurs when a wing reaches such a high angle of attack that an adverse pressure gradient develops on the wing surface. This adverse pressure gradient then forces the airflow to separate from the surface. This flow separation results in a rapid loss of lift, and the aircraft may become uncontrollable.

Therefore, high-lift devices provide an increase in maximum lift when required, mainly at taking off or landing.

A specific type of high-lift device is a leading edge slot/notch. Its application was relatively widespread in the early days of supersonic combat aircraft, especially those featuring a delta wing planform. Delta wings are a logical choice for supersonic flight as they combine the advantages of low wave drag in cruise and high subsonic maneuverability due to vortex lift. Such wings, however, experience an unstable pitch break due to the combination of low aspect ratio and high sweep angle.

Previous experience in early supersonic combat aircraft proved the effectiveness of leading edge notches or slots as a means of controlling spanwise flow on highly swept wing planforms. Slot fences, in particular, are a relatively simple way to cure such longitudinal instabilities in very thin supersonic wings at low speeds. Existing literature documents the effect of placing one, two, three or more slots at different spanwise positions and slot lengths. In addition to solving longitudinal stability problems, a potential drag reduction is observed at high angles of attack but with increasing low-alpha drag penalty. This is more evident when more than three slots are employed. This is probably due to the pressures on the vertical faces of the slots facing the flow. An example of such a device can be found on several models of supersonic combat aircraft. Some of these aircraft present leading edges where such notches extend roughly about 7% of the local chord length at a midspan position.

There is a drawback, though. In spite of reaching higher pitching moment values, the onset of the pitch instability occurs in a more pronounced manner.

The technical problem addressed by this invention is to provide a device to increase lifting coefficient, which, in turn, provides an increase in the aircraft controllability.

SUMMARY OF THE INVENTION

The invention proposes a notch or notches on the leading edge of the lifting surface at optimum spanwise stations. The notch comprises two walls adapted to be parallel to the direction of the incident flow to the lifting surface and a third wall adapted to face the incident flow to the lifting surface when it is in flight. Additionally, the lifting surface also comprises a retractable cover element such as a jacket or sleeve. The notch and the retractable cover element being configured such that when the retractable cover element does not cover the notch, the notch is exposed to the incident flow generating a vortex which increases the lift force of the lifting surface, delaying stall.

Operation of the device, that is, exposure of the notch to the incident flow is desired near stall of the lifting surface. For the specific case of a horizontal stabilizer this is likely to happen when a combination of maximum tail plane setting, angle of attack, and maximum elevator deflection takes place. In the case of VTP, this is likely to happen when a combination of high sideslip and maximum rudder deflection takes place. During cruise or other low angle of attack conditions, the notch is covered by the retractable jacket and the operation of the lifting surface is identical to a conventional one, i.e., identical to a lifting surface without any notch in its leading edge.

Therefore, according to the invention, the notch or notches could be covered or exposed to the incident flow, by means of the retractable jacket.

The invention allows a control of the lifting surface by activating the notch in situations near stall of the lifting surface in which additional lift force is required but without a penalty in the aerodynamic design of the lifting surface as the device allows to cover the notch without modifying the leading edge profile during non-operation. That is, when the notch is covered, the airflow sees the same streamlined shape of a standard lifting surface.

The actuation of the retractable jacket can be commanded manually by an activation of the pilot, or, as an alternative it can be made automatically when operation near stall is detected.

The proposed invention applies the characteristics of the leading edge notches to the standard operation of modern civil airliners. Emphasis is placed on its implementation on the empennage, where high-lift devices are rather uncommon.

BRIEF DESCRIPTION OF THE DRAWINGS

To complete the description and in order to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
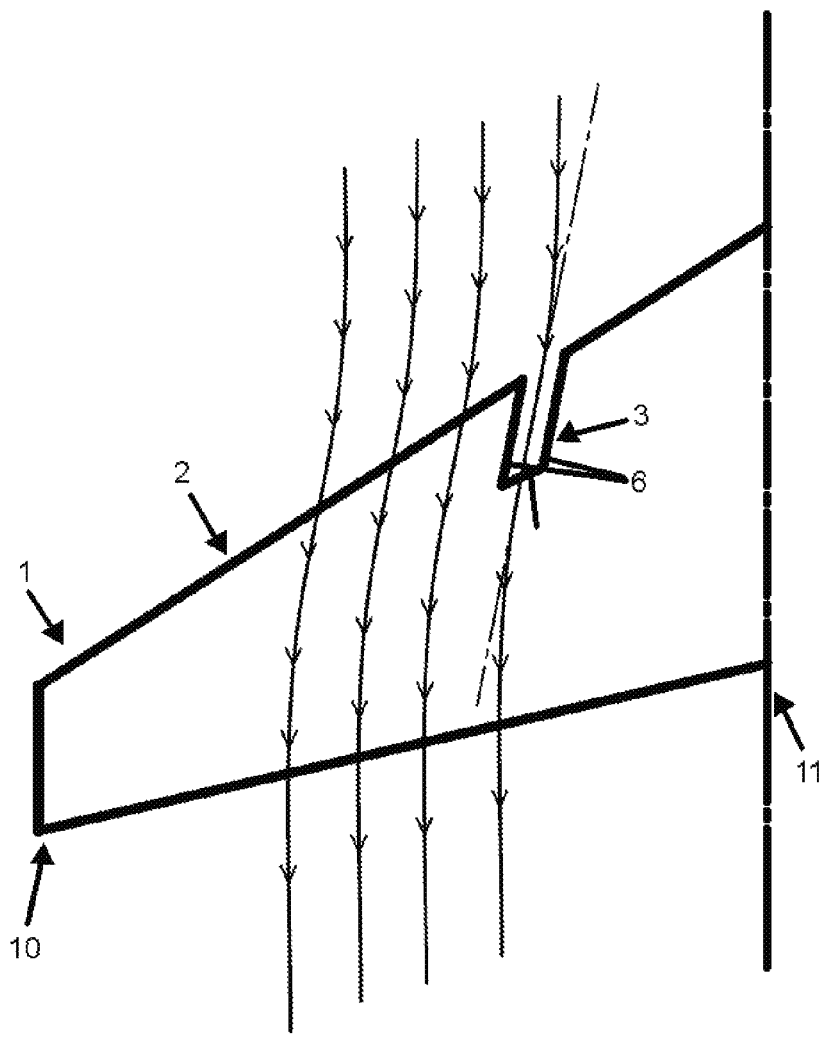
FIG. 1 shows a schematic representation of a lifting surface of an aircraft having a notch in the leading edge and the incident flow into the leading edge.
Figure 2:
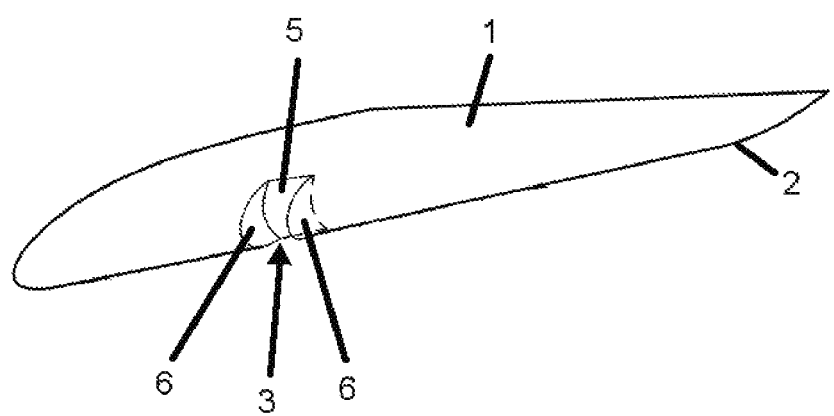
FIG. 2 shows a schematic representation of a lifting surface of an aircraft having a notch in the leading edge.
Figure 3:
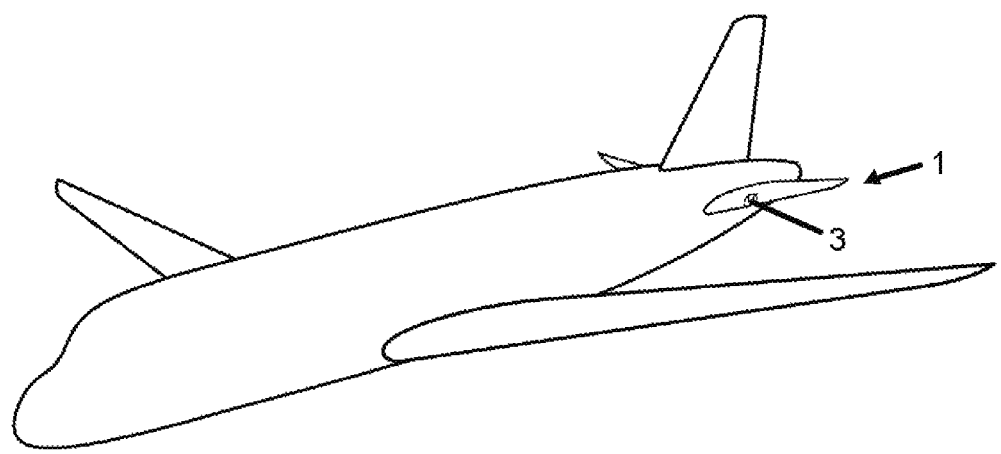
FIG. 3 shows a schematic representation of a lifting surface in an aircraft having a notch in the leading edge.
Figure 4:
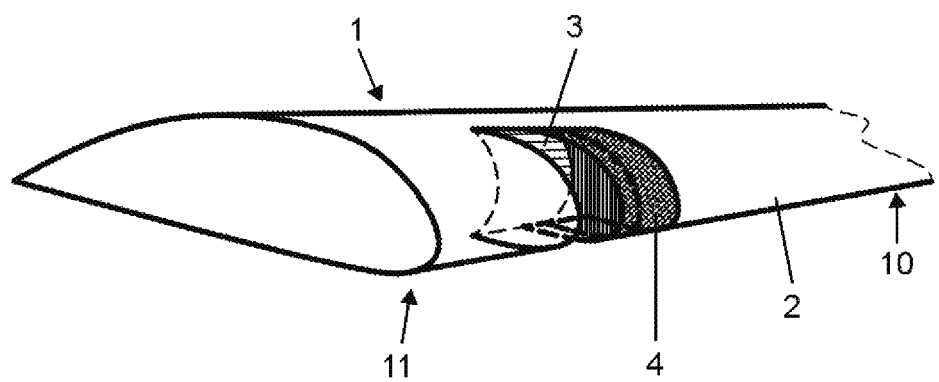
FIG. 4 shows a schematic representation of an embodiment of the leading-edge device object of the invention.

FIGS. 1 and 2 disclose a schematic representation of an embodiment of the leading edge (2) object of the invention. As it is shown, the notch (3) comprises three walls, two walls (6) parallel to incident flow and a third walls (5) facing the incident flow. The retractable jacket (4) is movable along the leading edge (2) when additional lift is needed. During cruise the retractable jacket (4) covers the notch (3) in default configuration to minimize drag.

Figure 5:
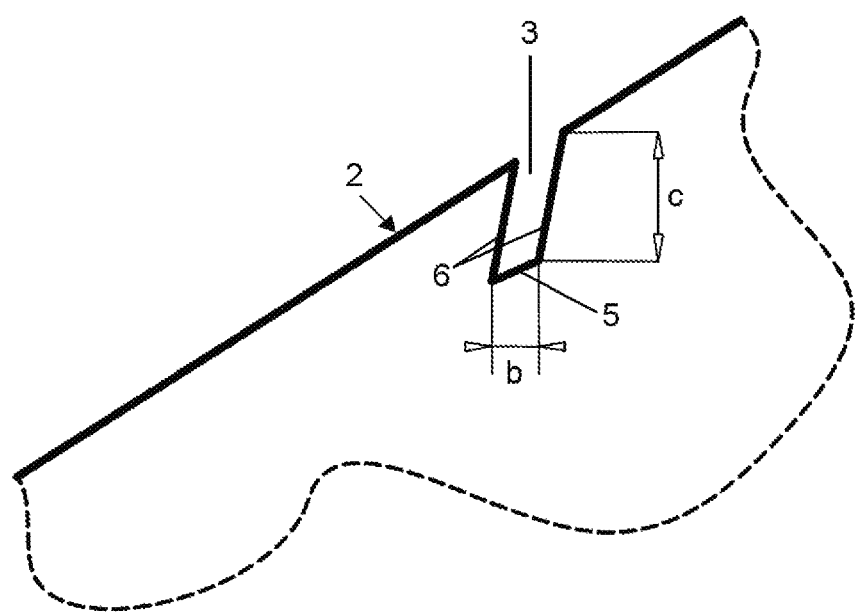
FIG. 5 shows a schematic representation of a lifting surface of an aircraft having a notch in the leading edge together with its aspect ratio.

The characteristic lengths of the notch (3) are chord (c) and span (b). The dimensions of the characteristic lengths must provide an aspect ratio c/b greater than 1 as can be seen in FIG. 5.

More particularly, the cross-section of the retractable jacket (4) follows the shape of the cross-section of the leading edge (2) and therefore allows covering the notch (3) without modifying the leading edge (2) profile when the retractable jacket (4) covers the notch (3). That is, the aeroshape of the jacket (4) which is the element of leading edge that slides is not modified with respect to the conventional airfoil section.

In the disclosed embodiment, the chord length of the notch (3) is smaller than the leading edge chord and extending up to a distance which guarantees the structural integrity of the front spar of the lifting surface (1) in the event of damage (bird strike, service vehicles, FOD, . . . ).

In the disclosed embodiment, the retractable jacket (4) is movable along the leading edge (2) in the spanwise direction. The thickness of the lifting surface (1) increases towards its root (11), therefore, if the retractable jacket (4) is located between the root (11) of the lifting surface (1) and the notch (3) when it is not covering the notch (3), then it is stowed inside the leading edge (2) of the lifting surface (1), i.e., under the skin of the leading edge (2). Conversely, if the retractable jacket (4) is located between the notch (3) and the tip (10) of the lifting surface (1) when it is not covering the notch (3), then it is stowed over the leading edge (2) of the lifting surface (1), i.e., covering the skin of the leading edge (2).

The lifting surface (1) also comprises an actuation mechanism for retracting the jacket (4) upon command, for instance, a spring-loaded actuator.

The internal exposed third wall (5) of the notch (3) facing the incoming flow ought to be streamlined in order to minimize a drag penalty at low angles of attack. This could be achieved by streamlining the third wall (5) toward a shape that replicates a secondary leading edge exposed only when the retractable jacket (4) is retracted/stowed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A lifting surface of an aircraft, comprising:
a leading edge and
a notch located in said leading edge,
the notch comprising two walls adapted to be parallel to the direction of the incident flow to the lifting surface and a third wall adapted to face the incident flow to the lifting surface when it is in flight,
the lifting surface also comprising a retractable cover element,
the notch and the retractable cover element being configured such that when the retractable cover element does not cover the notch, said notch is exposed to the incident flow generating a vortex which increases the lift force of the lifting surface, delaying stall, wherein the retractable cover element is retracted toward the tip of the lifting surface and is placed above the leading edge of the lifting surface when retracted.

2. The lifting surface of an aircraft, according to claim 1, wherein the lifting surface is a horizontal stabilizer.

3. The lifting surface of an aircraft, according to claim 1, wherein the cross-section of the retractable cover element follows the shape of the cross-section of the leading edge.

4. The lifting surface of an aircraft, according to claim 1, wherein the third wall of the notch comprises a streamlined shape.

5. The lifting surface of an aircraft, according to claim 1, wherein said notch does not extend beyond a front spar of the horizontal stabilizer.

6. The lifting surface of an aircraft, according to claim 1, further comprising an actuation mechanism for retracting said retractable cover element.

7. The lifting surface of an aircraft, according to claim 1, wherein the aspect ratio chord/span of the notch is greater than 1.

8. An aircraft comprising the lifting surface according to claim 1.

* * * * *